United States Patent

Toma

[15] 3,647,037
[45] Mar. 7, 1972

[54] CLUTCH WITH CENTRIFUGAL DUMP VALVE

[72] Inventor: Setsuo Toma, Tokyo, Japan

[73] Assignee: Nissan Jidosha Kabushiki Kaisha, Yokohama City, Japan

[22] Filed: May 19, 1970

[21] Appl. No.: 38,824

[30] Foreign Application Priority Data

May 28, 1969 Japan..................................44/40884

[52] U.S. Cl..........................192/106 F, 137/56, 192/104 F, 192/85 AA, 91/442
[51] Int. Cl........................................................F16d 23/10
[58] Field of Search..............192/106 F, 85, 85 AA, 103 FA, 192/104 F; 91/442; 137/56, 57

[56] References Cited

UNITED STATES PATENTS

| | | | |
|---|---|---|---|
| 2,864,479 | 12/1958 | Schindler | 192/85 AA |
| 3,266,506 | 8/1966 | Takahashi et al. | 137/56 X |
| 3,301,142 | 1/1967 | Cenko | 192/106 F X |
| 2,740,512 | 4/1956 | Fischer | 192/106 F X |
| 3,378,111 | 4/1968 | Greer et al. | 192/85 AA X |

*Primary Examiner*—Benjamin W. Wyche
*Attorney*—Sughrue, Rothwell, Mion, Zinn & Macpeak

[57] ABSTRACT

A hydraulic clutch having a piston controlling the engagement of a frictional multiple disk clutch and a drift-check valve for selectively exhausting the liquid under pressure from an operating chamber behind the piston. The drift-check valve comprises a relief passage and a truncated-conical valve element, which valve element blocks the relief passage with the flat base or end surface thereof upon an increase in the fluid apply pressure, and opens the relief passage by tumbling of the valve element upon a decrease in the fluid pressure.

5 Claims, 9 Drawing Figures

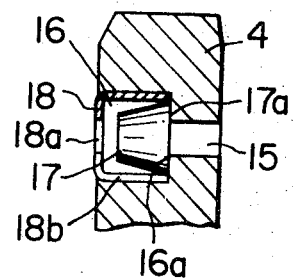
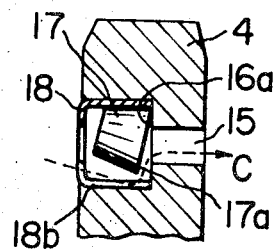
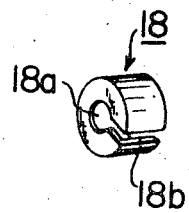
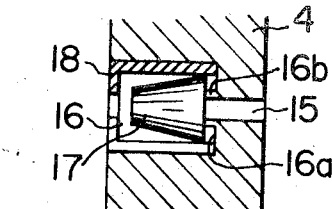
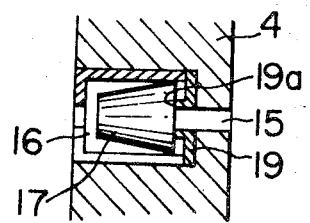
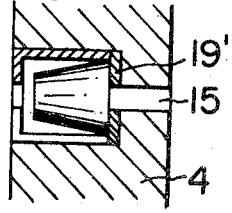

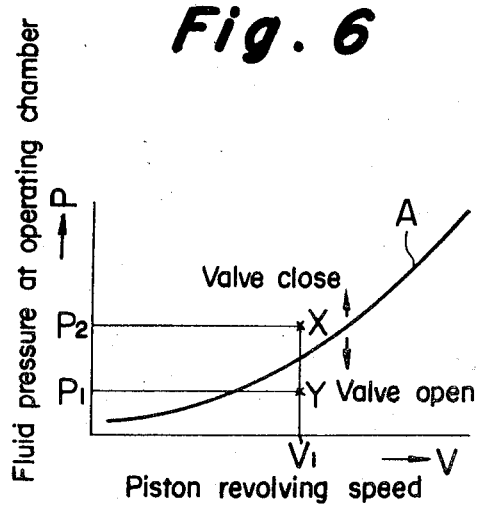

CLUTCH WITH CENTRIFUGAL DUMP VALVE

This invention relates to a hydraulically operated clutch for use in the automatic speed change device of an automobile, and more particularly to an improvement of a drift-check valve which is incorporated in a piston of the hydraulic clutch.

A known hydraulically operated clutch comprises a clutch drum, a driving clutch disk means, a driven clutch disk means, a biasing means which tends to separate the driving and driven clutch disk means from each other, and a piston disposed in the clutch drum and being hydraulically actuatable in parallel with the axis of the drum for causing frictional engagement of the driving and driven clutch disk means. Such hydraulically operated clutch usually includes one or more drift-check valves incorporated in the piston, for releasing drift pressure generated in the inside space of the piston by the rotation of the clutch drum. If the drift pressure in the piston is not released, it may cause erroneous engagement of the clutch. The drift-check valve of known type uses a ball or a membrane member, as its valve element. For instance, U.S. Pat. No. 2,740,512, issued to Harold Fischer on Apr. 3, 1956, discloses a relief valve with a ball element, which corresponds to the aforesaid drift-check valve.

The drift-check valve using a valve element, consisting of such ball or a membrane, has shortcoming in that the critical pressure, or timing of the opening and closing of the valve, is difficult to control. It is known that the inside pressure of the piston depends on the revolving speed of the piston but the response of the ball valve element, or a membrane valve element, to the variation of the inside pressure has been very difficult to control.

Therefore, an object of the present invention is to mitigate the aforesaid difficulties of the known drift-check valves, by providing an improved drift-check valve using a valve element which is of truncated-conical shape. The inventor has found that with the drift-check valve of the invention, the level of the critical internal pressure of the piston for causing the closing and opening of the drift-check valve can easily be regulated, by either modifying the relative position of the center of gravity of the truncated-conical valve element by varying the diameter, the height, and the taper thereof, or by changing the material of the truncated-conical valve element for varying the weight thereof, so that the centrifugal effects of the valve rotation on the valve element can be altered.

Another object of the present invention is to provide a hydraulic clutch which incorporates the drift-check valve of the last-mentioned type, for ensuring reliable operation of the clutch.

For a better understanding of the invention, reference is made to the accompanying drawings, in which:

FIGS. 3A and 3B are fragmentary sectional views, illustrating the operation of a drift-check valve incorporated in the hydraulic valve, respectively;

FIG. 4 is a perspective view of a sleeve usable in the drift-check valve;

FIGS. 5A to 5C illustrate different embodiments of the drift-check valve of the present invention; and FIG. 6 is a graph, showing the critical fluid pressure and the critical revolving speed of a hydraulic clutch, for actuating a drift-check valve incorporated therein.

Like parts are designated by like numerals throughout the drawings.

Referring to FIG. 6, it has been known that there are certain critical revolving speed and certain critical fluid pressure, at which a drift-check valve in the hydraulic clutch is actuated. The critical revolving speed and the critical fluid pressure are related with each other, as shown by Curve A of FIG. 6. Such relation between the critical revolving speed and the critical fluid pressure also depends on the shape and material of a valve element of the drift-check valve. However, with known valve elements consisting of balls or diaphragms, it has been difficult to freely control the critical values of the revolving speed and the fluid pressure, or to regulate the timing of the actuation of the hydraulic clutch.

Figure 1:
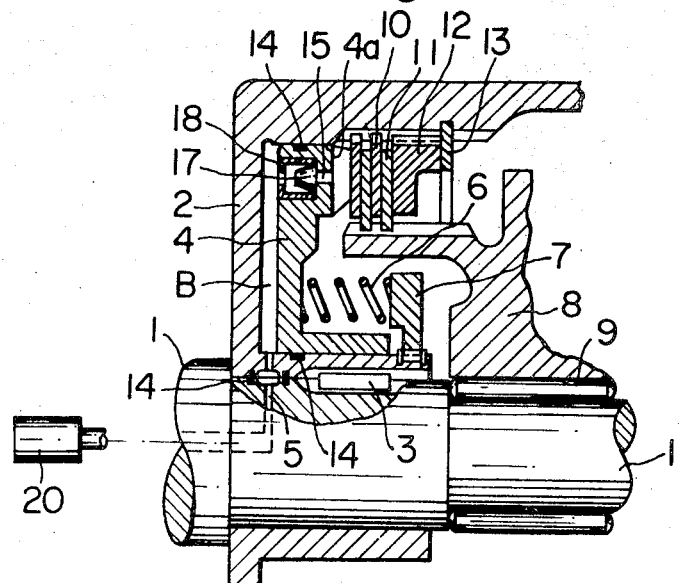
FIG. 1 is a vertical sectional view of the essential portion of a hydraulic clutch, according to the present invention.
Figure 2:
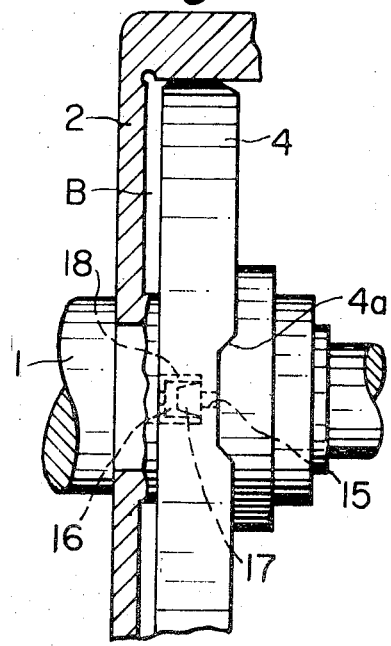
FIG. 2 is a horizontal sectional view of the hydraulic clutch.

The present invention intends to provide an improved hydraulic clutch of which the timing of actuation can be controlled at will. In FIGS. 1 and 2, showing an embodiment of the invention, an input shaft 1 has a drum 2, which is firmly secured thereto by means of keys 3. A piston 4 is slidably fitted on the inside of the drum 2 so as to move in parallel with the axis of the input shaft 1. An operating chamber B is defined between the opposing surfaces of the drum 2 and the piston 4, as shown in FIG. 1. A control passage 5 is formed through the input shaft 1 and the drum 2 in such a manner that liquid under pressure may be delivered from a liquid source means 20 to the operating chamber through the control passage 5. The liquid source means 20 may include a selective valve (not shown), which selectively communicates the control passage 5 to the liquid source or to an exhaust (not shown). In opposition to the liquid pressure in the operating chamber B, a compression spring 6 is inserted between the piston 4 and the spring seat 7 integrally secured to the drum 2.

A hub 8 is rotatably mounted on the input shaft 1 by means of needle bearings 9. A multiple disk clutch is comprised of clutch disks 10 secured to the drum 2 in an axially slidable manner and other clutch disks 11 secured to the hub 8 also in an axially movable manner. In order to ensure reliable operation of the multiple disk clutch, a retaining plate 12 is secured to the drum 2 by means of a lock ring 13, so that the clutch disks 10 and 11 can be held between the piston 4 and the retaining plate 12. Oil-seals 14 are provided to prevent fluid leakage from the operating chamber B.

According to the present invention, a relief passage 15 is bored through the piston 4, which passage is in parallel with the axis of the input shaft 1. A cylindrical enlarged portion is coaxially formed with the relief passage 15 at its junction with the operating chamber B, so that the cylindrical enlarged portion 16 may provide a recess on the pressure-receiving face of the piston 4. A truncated-conical valve element 17 is movably fitted in the cylindrical enlarged portion 16, so that the base surface 17a of the element 17 may face the bottom surface 16a of the cylindrical enlarged portion 16.

A cup shape sleeve 18, as depicted in FIG. 4, is inserted in the cylindrical enlarged portion 16, so as to prevent the valve element 17 from slipping out of the cylindrical enlarged portion 16. The cup shape sleeve 18 has an aperture 18a bored through the bottom wall thereof and a slit 18b extending from the aperture 18a to the upper edge of the sleeve along the sidewall thereof, as shown in FIG. 4. If the slit 18b of the sleeve 18 is disposed on a radial plane from the axis of the piston 4 to the axis of the sleeve 18, smooth liquid flow will be ensured from the operating chamber B to the relief passage 15. A notch 4a is formed on the back surface of the piston 4 at the outlet of the relief passage 15, so as to prevent the multiple disk clutch assembly from blocking the outlet opening of the relief passage 15.

FIGS. 5A to 5C illustrate different arrangements for the cylindrical enlarged portion 16 and the valve element 17. In the arrangement of FIG. 5A, an annular valve sheet 16b is formed at the inlet side of the relief passage 15, for improving the contact between the base surface 17a of the valve element 17 and the bottom surface 16a of the recess 16. FIG. 5B shows the use of a steel disk 19 with a valve seat 19a, which disk is placed on the bottom of the recess 16, for protecting the recess. It is also possible to place a flat steel disk 19' instead of the steel disk 19 with the valve seat, as shown in FIG. 5C.

In operation, when high-pressure fluid is delivered from the control passage 5 to the operating chamber B between the drum 2 and the piston 4, if the fluid pressure P and the revolving speed V fall in the range above Curve A of FIG. 6, for instance at a point X representing a pressure $P_2$ and a revolving speed $V_1$, then the base surface 17a of the valve element 17 comes in contact with the bottom surface 16a of the recess 16, as shown in FIGS. 1 and 3A. Thereby, the relief passage 15 is blocked, so that the pressure in the operating chamber B increases, for moving the piston 4 to the right, as seen in FIG. 1. Thus, the clutch disks 10 and 11 engage with each other, so as to transmit the power from the input shaft 1 to the hub 8 therethrough.

If the supply of high-pressure fluid from the control passage 5 is interrupted, and the pressure in the operating chamber decreases to such an extent that the pressure P and the revolving speed V fall below Curve A of FIG. 6, e.g., a point Y representing a pressure $P_1$ and a speed $V_1$, then the valve element 17 is inclined by the centrifugal force acting thereon, as shown in FIG. 3B. Thereby, the base surface 17a of the valve element 17 departs away from the bottom wall 16a of the cylindrical enlarged portion 16, so as to allow the fluid discharge from the operating chamber B through the relief passage 15, as indicated by the arrow C of FIG. 3B. The slit 18b of the sleeve 18 acts to guide the smooth flow of the fluid to the relief passage 15, provided that the slit 18b is disposed radially toward the axis of the piston 4.

According to a feature of the present invention, the timing of the valve operation can be controlled accurately and at will, by changing the diameter, the height, the taper, or the material of the truncated-conical valve element 17. Thereby, the flexibility in the control of the drift-check valve is greatly improved, as compared with that of conventional drift-check valves with elements consisting of balls or diaphragms.

As described in the foregoing disclosure, according to the present invention, there is provided an improved hydraulic clutch having drift-check valves whose operating timing, or ON-OFF timing, can be controlled at will. Furthermore, the hydraulic clutch of the present invention is simple in construction, and can easily be manufactured at a low cost.

What is claimed is:

1. A centrifugally operated relief valve for a hydraulically operated clutch of a planetary speed change device, said clutch having a drum rotatable about an axis with a piston being slidably positioned within said drum for defining an operating chamber of a servomotor for actuating the clutch upon the application of fluid pressure against said piston, said relief valve comprising, a relief passage passing through said piston parallel to the axis of rotation of said drum and piston, said relief passage having an enlarged cylindrical portion on the side of the piston forming said operating chamber, and a valve element movably located in said enlarged cylindrical part, said valve element being of truncated-conical shape, the enlarged base end thereof being positioned adjacent the bottom surface of said enlarged cylindrical part of said relief passage away from the operating chamber, the enlarged base of said valve element being forced against the bottom surface of the enlarged cylindrical part to close said relief passage upon the application of fluid pressure to said operating chamber, said valve element being moved to open said relief passage upon a decrease in fluid pressure against said piston and when the centrifugal force thereon created by rotation of said drum and piston reaches a predetermined value.

2. A relief valve according to claim 1, characterized in that the enlarged cylindrical part of said relief passage further comprises a cup-shaped sleeve positioned therein, said cup-shaped sleeve having a bottom portion at one end and a rim around an open end opposite said bottom portion, said cup-shaped sleeve having an opening in the bottom thereof, the bottom of said cup-shaped sleeve positioned toward the operating chamber of said servomotor.

3. A relief valve according to claim 2, characterized in that said cup-shaped sleeve further comprises a slit extending from said opening in the bottom along the sidewall of said sleeve to the opposite rim thereof, said slit being disposed in a radial plane extending from the axis of said piston to the axis of said sleeve.

4. A relief valve according to claim 1, further comprising a valve seat member disposed on the bottom surface of said enlarged cylindrical part of said relief passage, said valve seat member facing the large diameter base of said truncated-conical valve element.

5. A relief valve according to claim 3, further comprising a valve seat member disposed on the bottom surface of the enlarged cylindrical part of said relief passage, said valve seat member including a flat steel disc having a central aperture formed therethrough surrounded by an annular projection, said annular projection extending toward the enlarged diameter base of said truncated-conical valve element.

* * * * *